United States Patent [19]

Gloviak et al.

[11] 4,020,706

[45] May 3, 1977

[54] TIRE SPINNER WITH DUAL 4 BAR MECHANISM FOR SPIN AND BRAKE

[76] Inventors: John A. Gloviak, 750 W. Hutchinson, Chicago, Ill. 60613; Robert D. Rice, 5035 Lawn Ave., Western Springs, Ill. 60558

[22] Filed: Apr. 11, 1975

[21] Appl. No.: 567,187

[52] U.S. Cl. .................................................. 74/16
[51] Int. Cl.² ...................................... F16H 37/00
[58] Field of Search ..................................... 74/16

[56] References Cited

UNITED STATES PATENTS

| | | | |
|---|---|---|---|
| 2,557,867 | 6/1951 | Foster | 74/16 |
| 2,565,233 | 8/1951 | Hunter, Jr. | 74/16 |
| 3,071,221 | 1/1963 | Hosking | 74/16 |
| 3,646,824 | 3/1972 | Dillard | 74/16 |

*Primary Examiner*—Samuel Scott
*Assistant Examiner*—Wesley S. Ratliff, Jr.

[57] ABSTRACT

A wheel spinner assembly used in dynamic balancing to spin the wheel to determine the magnitude and angular orientation of the imbalance. A motor and spinner are provided mounted on a support for pivoting the spinner into engagement with the wheel to be balanced. Also provided is a brake element that also has a pivotally mounted support so that the brake may be pivoted into engagement with the associated wheel after spinup. For the purpose of pivoting both the brake and the spinner selectively into engagement with the wheel to be balanced, a linkage assembly is provided including a first link connected to the spinner support and a second link pivotally connected to the first link at one end and the brake support at the other end. This linkage permits both the brake and the spinner to be operated by a common handle and also provides the operator with the proper leverage and feel during both braking and spinup. Another feature of the present invention is that both the brake support and the spinner and motor support are pivotally mounted about the spinner wheel axle providing a simplified construction. For resisting the tendency of the tire to urge the spinner assembly away from the tire there are provided resilient feet projecting downwardly from the spinner for gripping the ground surface.

11 Claims, 12 Drawing Figures

TIRE SPINNER WITH DUAL 4 BAR MECHANISM FOR SPIN AND BRAKE

BACKGROUND OF THE PRESENT INVENTION

There have in the past been provided a plurality of spinner assemblies for bringing a vehicle tire up to speed for the purpose of dynamically balancing the wheel. These for the most part have had the primary disadvantage of complexity as well as being difficult to operate. For the most part prior spinners have required two handles, one for operating the brake mechanism and one for operating the spinner, thereby not only complicating the assembly of the spinner but also making it more difficult to operate the device. A still further disadvantage in prior art spinner assemblies is that they require significant effort on the part of the operator because of the mechanical advantage of the linkage assemblies provided.

Moreover, prior wheel spinner assemblies have had the tendency to push the vehicle tire upwardly during spinning sometimes disconnecting the pickup from the wheel and making additional work for the operator. A still further disadvantage of prior construction is that they are difficult to manufacture and costly primarily because of the complicated linkage systems.

SUMMARY OF THE PRESENT INVENTION

In accordance with the present invention a dynamic wheel spinner is provided adapted to be used in dynamic balancing a vehicle wheel for spinning the wheel up to speed, which may be approximately 100 m.p.h. or 1200 r.p.m. After determining the magnitude and angle of unbalance, the present wheel spinner is adapted to brake the wheel to decrease the overall time involved in the balancing operation, and the weights are then applied. A primary object of the present invention is to simplify the construction of a wheel spinning apparatus and also to render it easier for the operator to make the various manipulations in spinning and braking. Toward this end a motor and spinner support is provided pivotally mounted about the axle of the wheel spinner. A brake support is provided and it is also pivotally mounted about the axle of the wheel spinner thereby simplifying the construction of the entire assembly.

For the purpose of pivoting both the brake and the spinner selectively into engagement with the wheel to be balanced, a first link is provided pivotally mounted to the spinner support. A second link is provided pivotally mounted to the brake support and pivotally mounted to the first link at the other end. A handle is provided rigidly connected to the first link and designed so that upon forward movement of the handle the spinner will be pivoted into engagement with the tire and upon rearward movement of the handle, the brake will be pivoted into engagement with the tire.

In prior art constructions, both the spinner and the brake tend to move the wheel vertically during engagement. To obviate this both the spinner and the brake have been moved upwardly substantially in a horizontal plane with the axle of the wheel to be balanced. This obviates the problem of disconnecting the pick-up head from the attaching fixture on the axle that occurs frequently in prior constructions. Toward this end, the brake is positioned so that it encapsulates the spinner and has a braking surface above the periphery of the spinner wheel itself.

A still further object of the present invention is the provision of a wheel spinner in which flexible depending feet are provided that raise the spinner wheels off the ground and provide a reaction force against the reaction force of the tire to be balanced on the spinner wheel and the brake, thereby providing an extremely stable and easily operable spinner.

DETAILED DESCRIPTION OF THE PREFERRED EMBODIMENT

Figure 1:
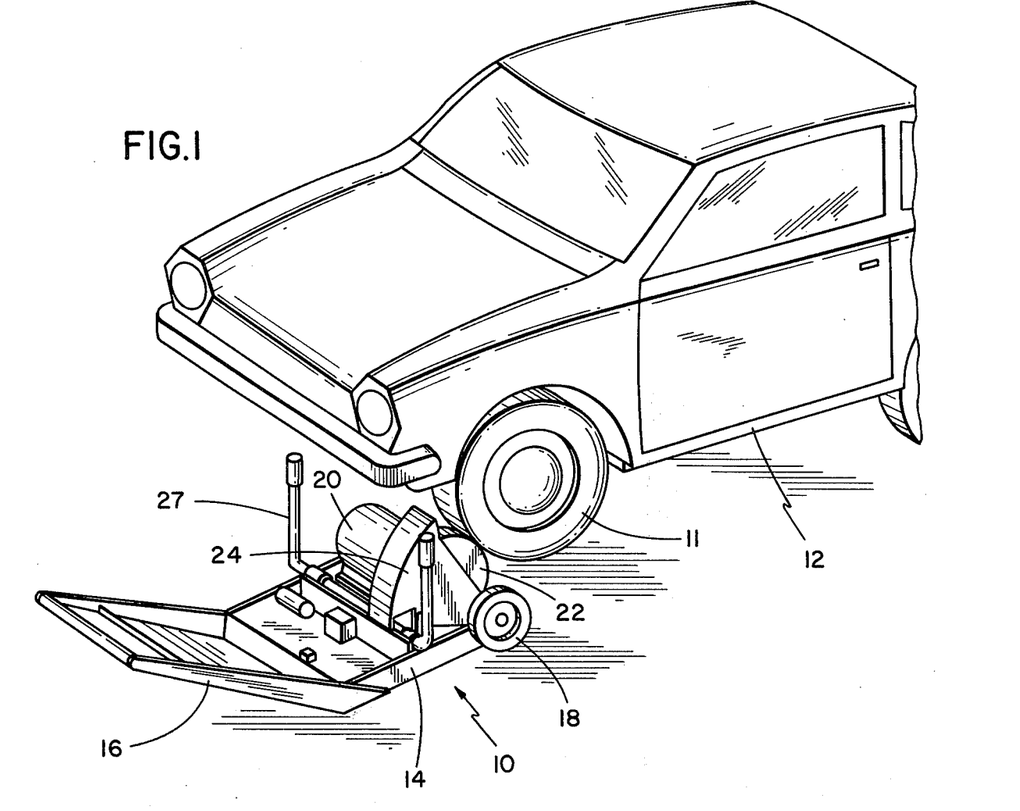
FIG. 1 is a schematic view of the spinner shown in its operative position with respect to an automobile.
Figure 2:
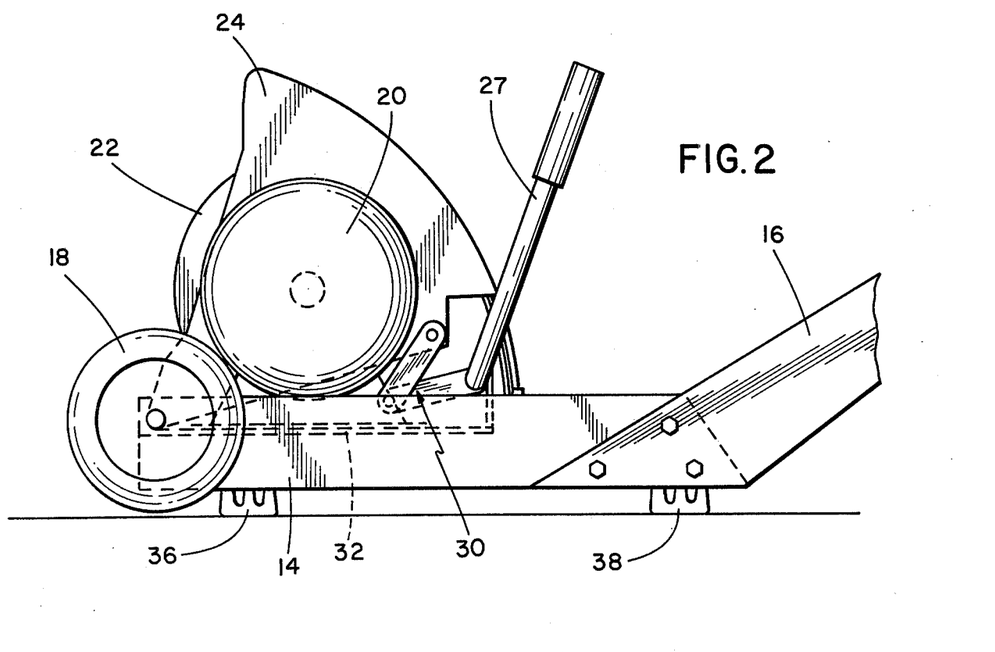
FIG. 2 is a side elevation, somewhat schematic, of a wheel spinner assembly according to the present invention.

Referring to the drawings, and particularly FIGS. 1 and 2, a wheel spinner 10 is illustrated in its operative position with respect to a front wheel 11 of a vehicle 12. The spinner 10 is seen to consist generally of a frame 14, a handle assembly 16, forward wheels 18, and a motor 20 driving a wheel spinner 22. The spinner 22 is adapted to rotate the wheel 11 up to approximately 1200 r.p.m. for the purpose of determining the amount of unbalance in the wheel.

Also provided is a brake member 24 also adapted to engage the wheel 11 and stop the same so that the weights may be applied to the wheel 11 without the operator waiting for the wheel to freely rotate until stopping under its own frictional forces.

For the purpose of operating both the spinner 22 and the brake 24, a handle assembly 27 is provided that when moved in the forwardly direction toward the vehicle will actuate the spinner 22 and when moved rearwardly away from the vehicle will actuate the brake 24, all through a common linkage in a much simplified fashion over prior art devices.

As seen in FIG. 2, a suitable linkage assembly 30 interconnects the brake 24 and a spinner support 32 for the purpose of providing a common actuator for the two members. As seen more clearly in FIGS. 2 and 3 the frame 14 is supported on downwardly projecting rubber feet 36 and 38 which serve to hold the spinner in position against the force of the tire 11.

Figures 3, 11:
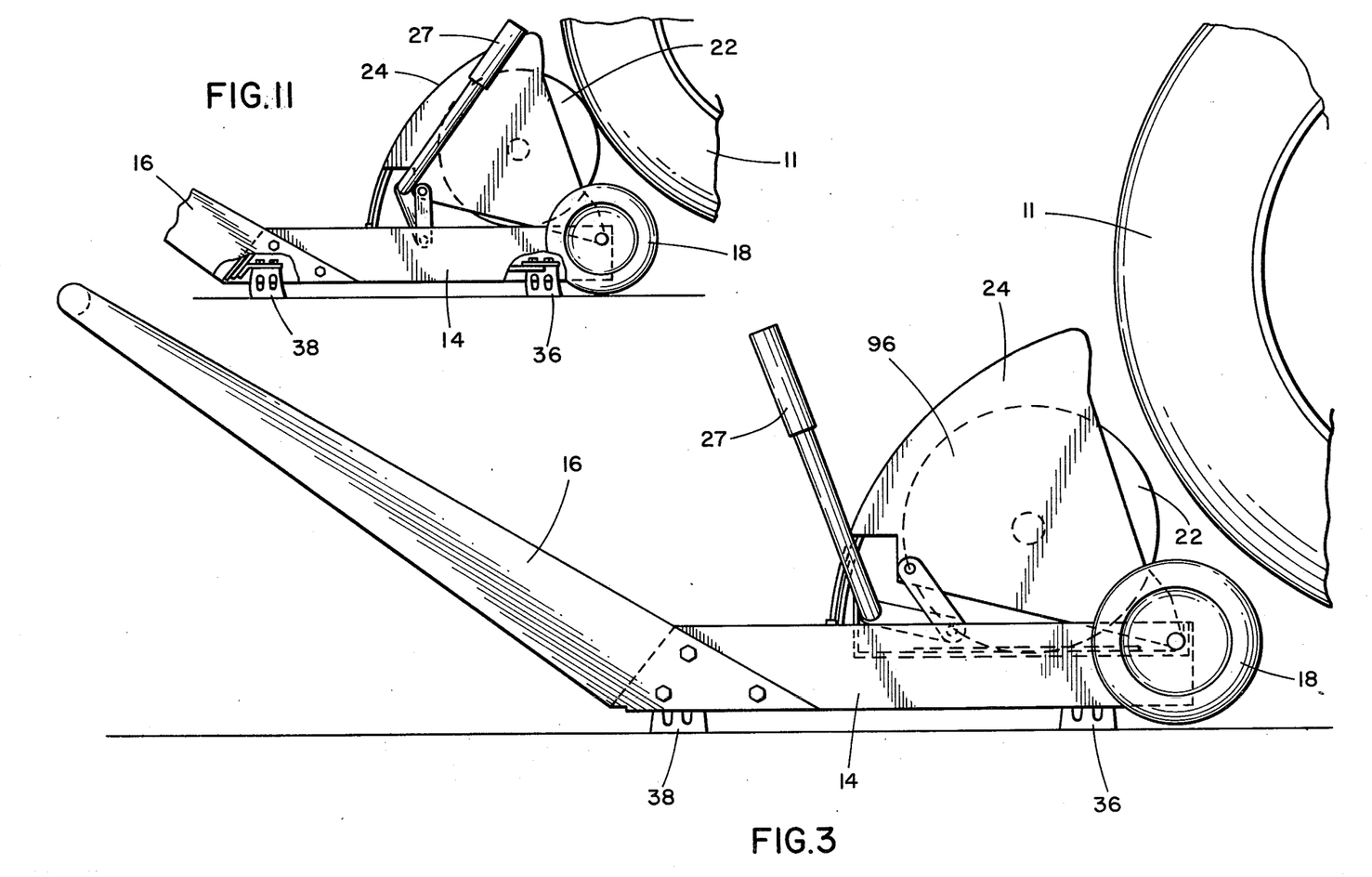
FIG. 3 is a side elevation of the present wheel spinner shown in conjunction with a vehicular wheel assembly, generally similar to the view shown in FIG. 2 but reversed.
FIG. 11 is a view similar to FIG. 10 but with force being applied to the wheel spinner and the resilient feet being deformed.

The bottom surfaces of the feet 36 and 38 project below the lowermost portion of the wheel 18 so that the wheel is off the ground surface during spinning and braking so that the reaction forces are fully opposed (FIG. 11).

Figure 4:
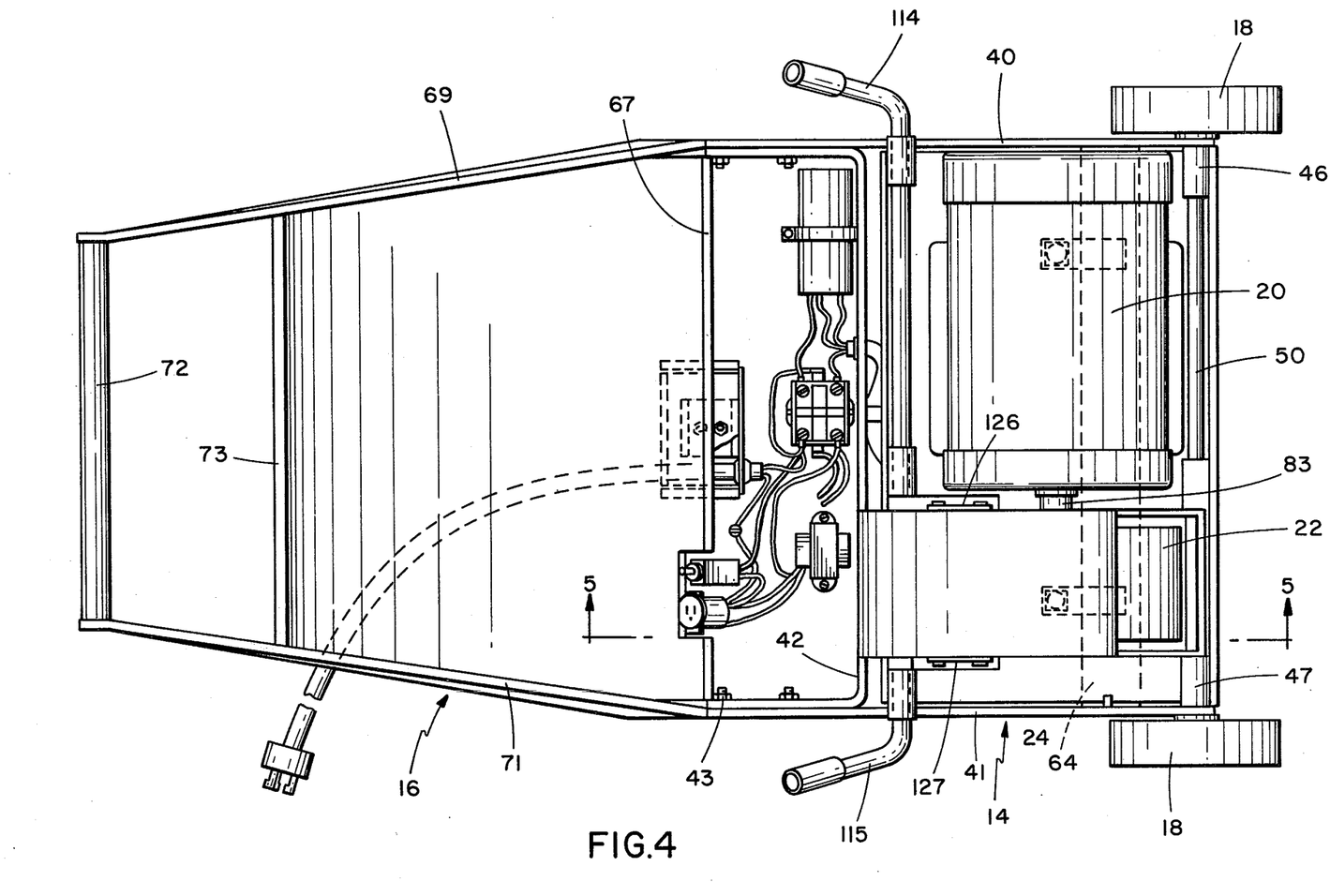
FIG. 4 is a top elevation of the spinner shown in FIGS. 1 to 5.

As seen in FIG. 4, the frame assembly 14 consists of side frame members 40 and 41 and a rear frame member 42 fixed to the side frame member by fasteners 43. At the forward ends of the side frame members 40 and 41 are axle journals 46 and 47 which rotatably receive axle 50 carried by the ends of forward wheels 18. Projecting downwardly from the frame are resiliant rubber feet 36 and 38. Foot 36 is fixed by fastener 60 to a cross-member 64 extending between the side frame members 40 and 41. The feet 36 and 38 are generally rectangular with tapered side surfaces 61 and tapered apertures 62 for the purpose of increasing the resiliency of the feet in holding the spinner firmly against wheel 11.

The rear foot 38 is identical in construction and is fixed to an angle plate 65 by fasteners 66. Angle plate 65 is in turn welded to a cross-member 67 extending between the arms of the back frame member 42 as seen in FIG. 4.

Viewing FIG. 4, handle assembly 16 includes inwardly projecting members 69 and 70, connected at their ends by cross-members 72 and 73.

Figure 5:
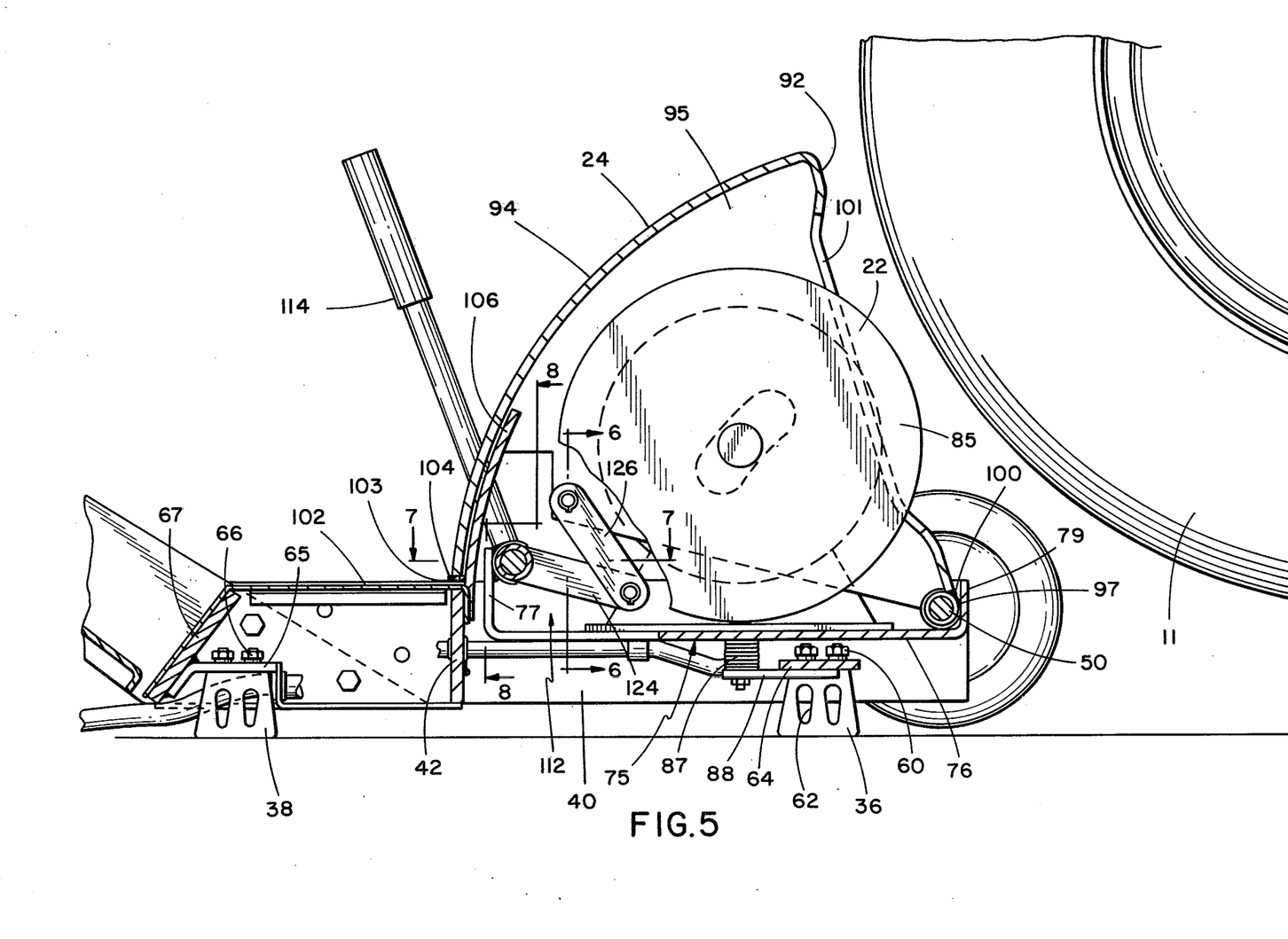
FIG. 5 is a fragmentary cross-section taken generally along line 5—5 of FIG. 4 illustrating the handle and linkage in the neutral position.
Figure 6:
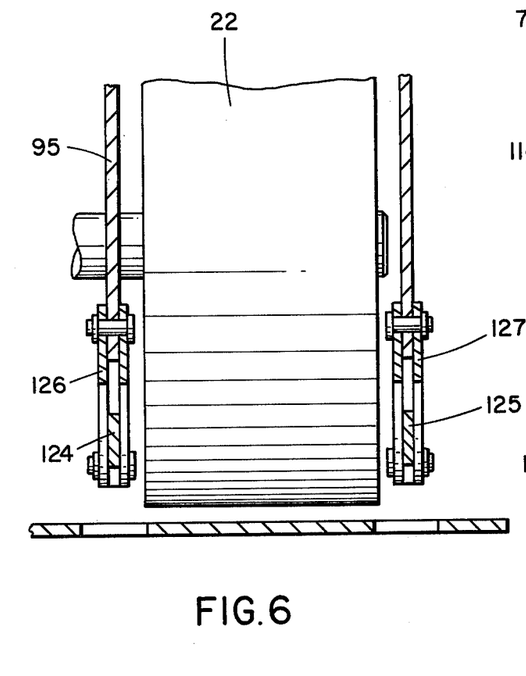
FIG. 6 is a fragmentary section taken generally along line 6—6 of FIG. 5 illustrating the dual linkage for the brake and spinner assemblies.

Viewing FIG. 5, pivotally mounted on the axle 50 is a support plate 75 having a bottom surface 76, an upwardly turned back surface portion 77 and an upwardly turned front surface portion 79. The spinner motor support plate 75 is welded to journals rotatably mounted on the axle 50. Plate 75 carries electric motor 20 having a drive shaft 83 as seen in FIG. 4 drivingly connected to spinner wheel 22. When plate 75 tilts upwardly about the axis of axle 50, the spinner wheel 22 engages tire 11 for rotating the same. Spinner 22 has a cylindrical outer surface 86.

The plate 75 is biased upwardly to assist the operator in pivoting plate 75 and spinner 22 by a coil spring 87 fixed to the bottom of the plate 75 as seen in FIG. 5 and reacting against member 88 which is carried by the cross frame member 64.

Surrounding the spinner 72 is a braking member 24 having a forward brake shoe surface 92 engageable with the wheel 11 for the purpose of slowing down and stopping the wheel after the spinning is completed. The braking element 24 includes an arcuate back surface 94 and side surfaces 95 shown in FIG. 5 and 96 shown in FIG. 3. Brake member 24 is pivotally mounted about the axis of axle 55 by a collar 97 rotatably mounted on the axle 50 and to which the brake member 24 is welded as indicated at 100 in FIGS. 5, 10 and 12. The brake element 24 has an opening as indicated at 101 for the purpose of permitting extension of the spinner 22 through the arcuate shaped brake element 24. A sheet metal member 102 extends between the frame member 67 and frame member 42 and on top of this metal member is a rubber bumper member 103 against which the bottom end 104 of the brake back support 94 engages for the purpose of reducing noise and impact wear on the apparatus.

Figure 8:
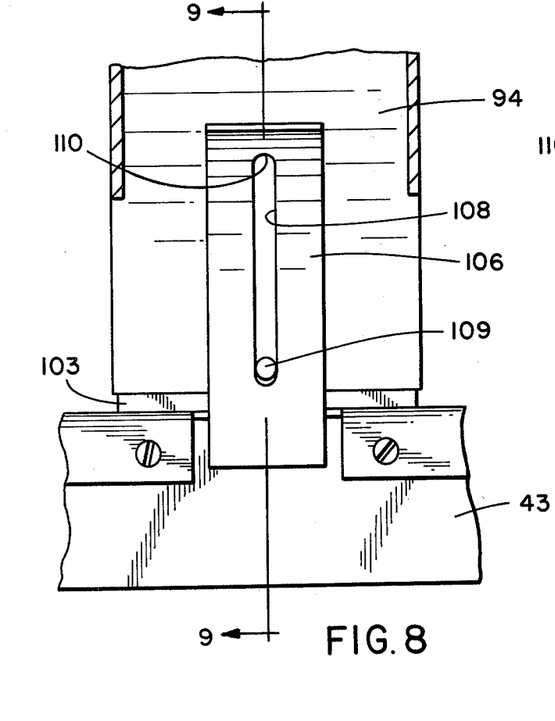
FIG. 8 is a fragmentary view taken generally along line 8—8 of FIG. 5 illustrating the stop mechanism for the brake support.
Figure 9:
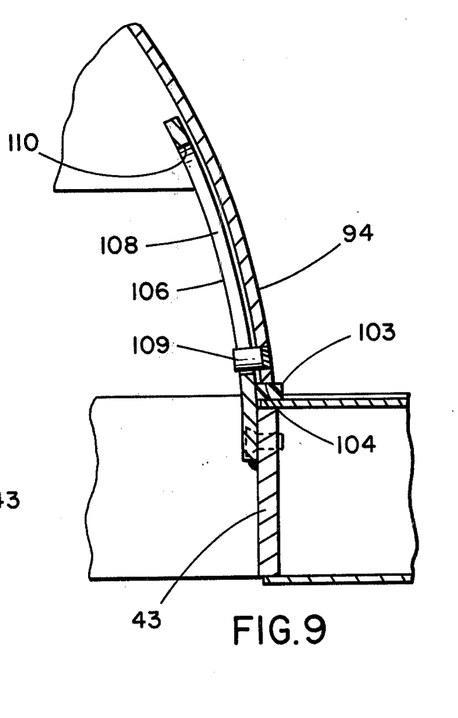
FIG. 9 is a cross-section taken generally along line 9—9 of FIG. 8 also illustrating the stop mechanism for the brake assembly.

An arcuate stop member 106 as illustrated in FIG. 8 is provided fixed to the frame member 42 for the purpose of limiting the arcuate pivotal movement of the brake member 24. Toward this end the stop member 106 has slot 108 into which a pin 109 rides carried by the brake shoe. The upper extremity 110 of the slot limits movement of the pin 109 and hence the brake shoe as it moves forwardly toward the wheel 11.

Figure 7:
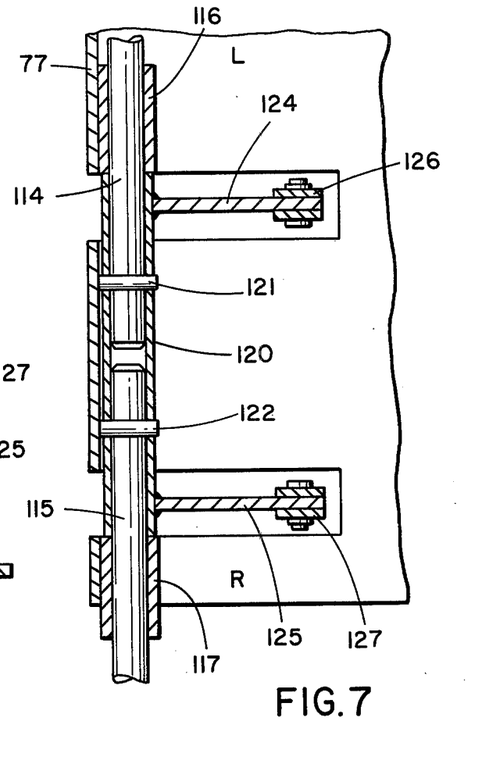
FIG. 7 is a cross-section taken generally along line 7—7 of FIG. 5 illustrating the handle assembly.

A linkage assembly 30, 112 is provided for pivoting both the spinner support plate 75 and the brake 24 forwardly into engagement with wheel 11, as seen in FIG. 5. Handles 114 and 115 as seen in FIG. 4 are provided for actuating the linkage 112. As seen in FIGS. 4 and 7 handle rods 114 and 115 are rotatably journaled in collars 116 and 117 fixed to the upturned flange 77 of the spinner support plate 75. A sleeve 120 as seen in FIG. 7 surrounds handle rods 114 and 115 and is pinned thereto as seen at 121 and 122.

Forming the first links of the linkage assembly 112 are links 124 and 125 welded to the sleeve 120 and pivoted thereby. Pivotally carried on the ends of links 124 and 125 are second linkages 126 and 127, each being double links pivoted at their other ends to sides 95 and 96 of the brake 24.

Figure 10:
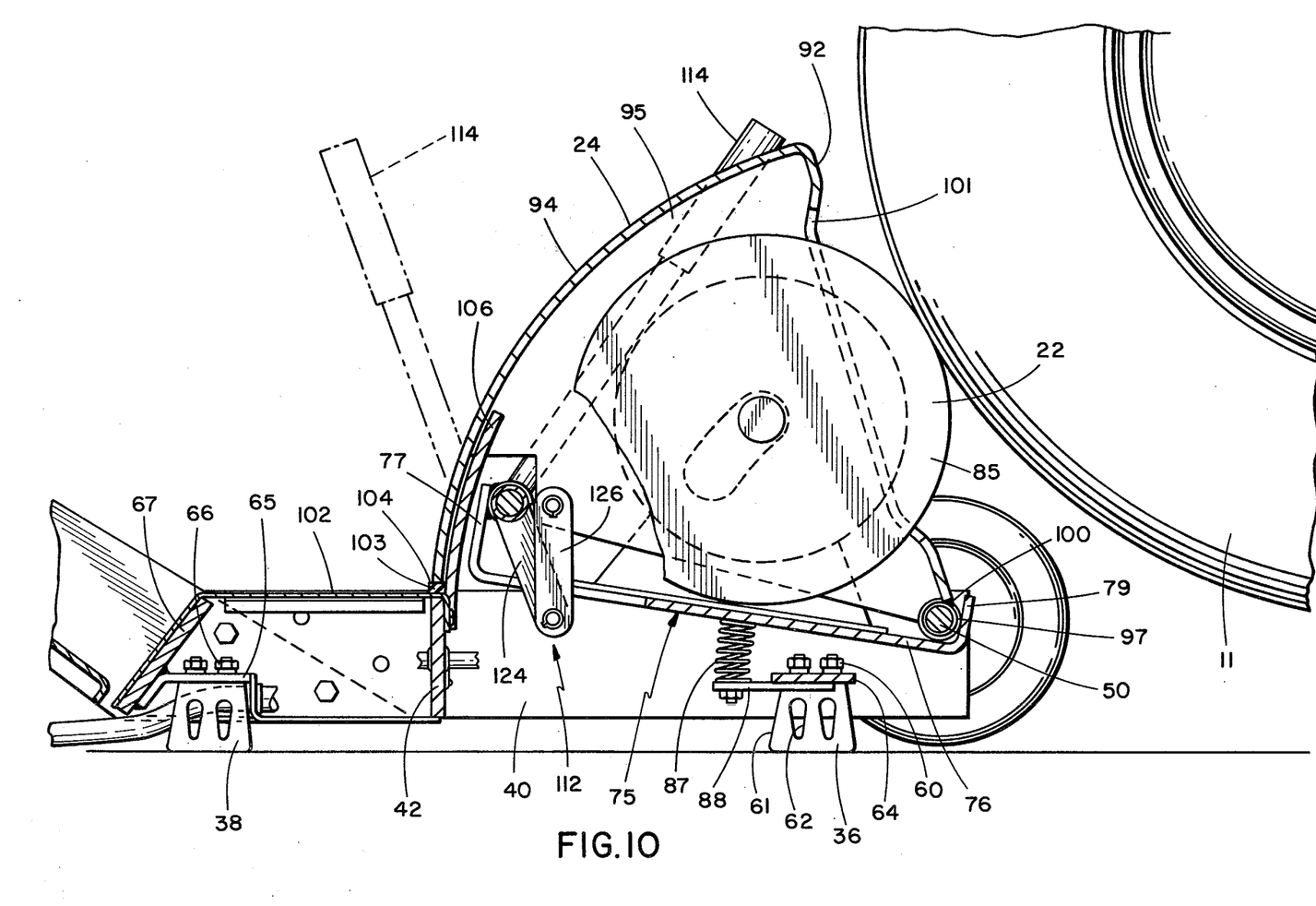
FIG. 10 is a cross-section of the spinner assembly illustrated with the spinner in its operative position against the wheel.

In operation during the spinning mode motor 20 is started rotating spinner 22 with the spinner assembly 10 in the position illustrated in FIG. 5. The operator then rotates handle 14 in a forwardly direction as shown in FIG. 10 rotating link 114 in a clockwise direction which in turn rotates the link 126 in a clockwise direction with the force of link 124 on link 126 being in a downward direction so that the brake 124 remains stationary while the spinner support plate 75 pivots in a clockwise direction about axle 50 with the assistance of spring 87. After the unbalance of the wheel has been determined handle 14 is moved back to the dotted line position shown in FIG. 10 and which corresponds to its normal position shown in FIG. 5 and the links assume the position shown in FIG. 5.

Figure 12:
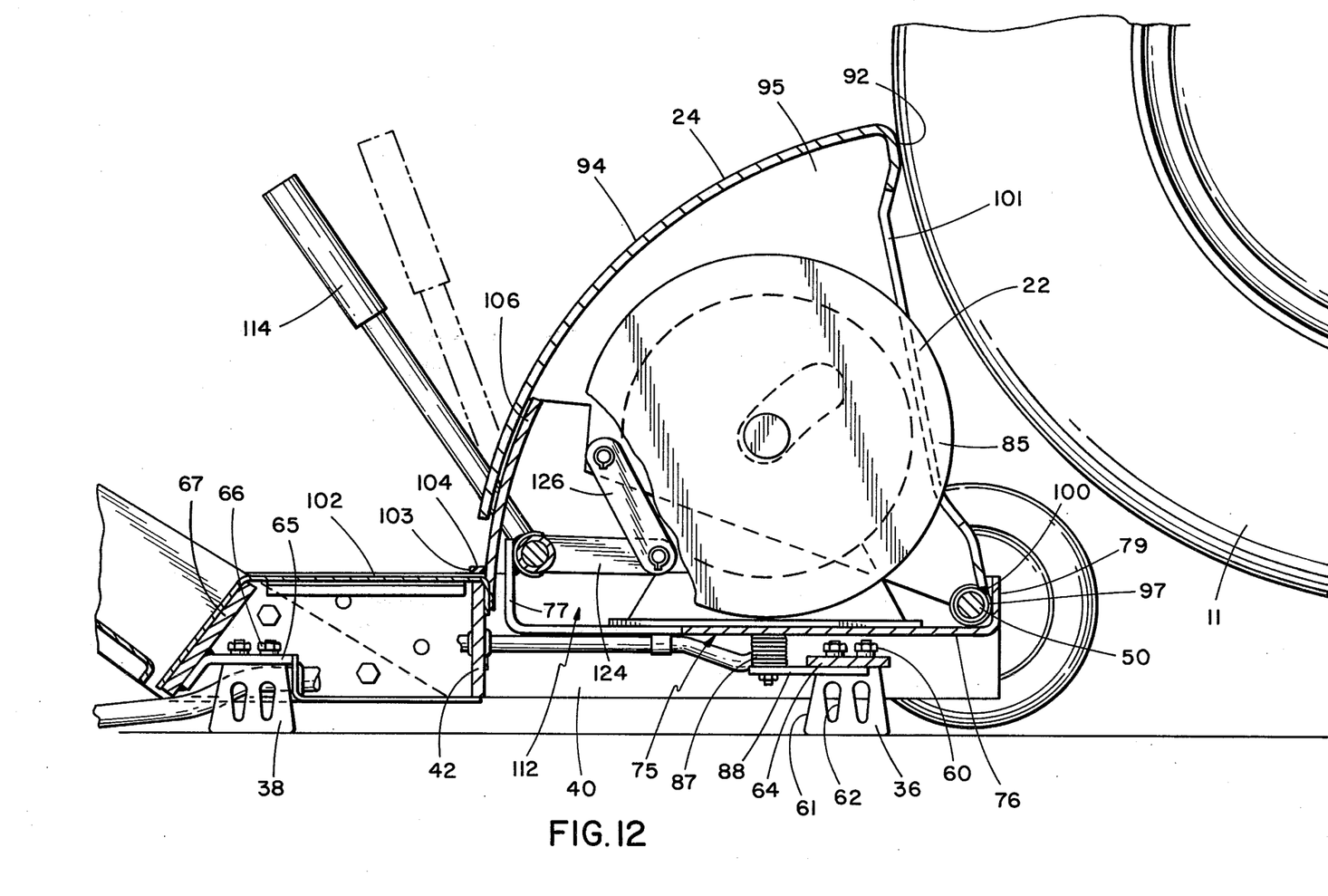
FIG. 12 is a cross-section of the wheel spinner assembly shown with the brake shoe in operative position against the tire.

In the braking mode shown in FIG. 12 handle 114 is rotated rearwardly or in a counterclockwise direction which pivots link 114 in a counterclockwise direction pushing upwardly on link 126 and forcing the brake 24 to pivot about axle 50 with the brake shoe surface 92 engaging the wheel 11 to effect braking.

After braking is completed the handle 14 is pivoted forwardly and the brake 24 again assumes the position shown in FIG. 5. Note that link 114 in FIG. 12 is substantially horizontal during braking while the link 126 is substantially vertical thereby providing high leverage during braking. It should also be noted that plate 75 remains stationary during the braking mode shown in FIG. 12.

What is claimed is:

1. A tire spinner comprising; frame means, motor means mounted for movement on said frame means, a wheel spinner carried by said motor means, brake means mounted for movement on said frame means, common linkage means interconnecting said brake means and said motor means and handle means connected to said linkage means for selectively operating said spinner or said brake means.

2. A tire spinner as defined in claim 1, wherein said handle means is movable in a first direction for operating said brake means and a second opposite direction for operating said spinner.

3. A tire spinner as defined in claim 1, including a pivotally mounted support for said motor means, a pivotally mounted support for said brake means, first link means pivotally carried by said motor means support, second link means pivotally carried by said brake means support, said handle means being connected to one of said link means.

4. A tire spinner as defined in claim 3, including an axle mounted on said frame means, said motor support pivotally mounted on said axle.

5. A tire spinner as defined in claim 4, wherein said brake means support is independently pivotally mounted on said axle.

6. A wheel spinner assembly, comprising; a frame, a wheel axle on said frame, a wheel brake having a support rotatably mounted on said axle, a wheel spinner having an independent support pivotally mounted on said axle, journals on said spinner support, rod means rotatably mounted in said journals on said spinner support, handle means for rotating said rod means, a first link connected to said rod means, a second link pivotally connected to said brake support at one end and at the other end to said first link whereby when the handle means is moved in one direction the brake is actuated into engagement with the associated wheel and when the handle means in moved in the opposite direction the spinner is moved into engagement with said associated wheel.

7. A wheel spinner assembly as defined in claim 6, wherein said brake support includes an arcuate back partly surrounding said spinner and spaced sides, said first link means including two links each adjacent one of said sides, said second link means including two links each pivotally connected to one of said sides.

8. A wheel spinner assembly as defined in claim 6, wherein said brake is approximately parallel with the axle of the associated wheel.

9. A wheel spinner assembly as defined in claim 6, including wheels on said axle, and resilient rubber feet projecting downwardly from said frame, said feet projecting below the lower portion of said wheels.

10. A wheel spinner assembly, comprising; a frame, motor means mounted on said frame, a wheel axle, a cylindrical spinner driven by said motor means and mounted for movement on said frame, means for moving said spinner on said frame, a brake supported independently for movement about said axle, means for moving said brake, said brake having a braking surface, said surface being positioned substantially horizontally with respect to the axle of the wheel to be balanced.

11. A wheel spinner assembly as defined in claim 10, wherein said brake includes an arcuate back surface and spaced side surfaces surrounding said spinner.

* * * * *